Oct. 1, 1935.  A. L. FREEDLANDER  2,016,140
BELT
Original Filed July 13, 1931
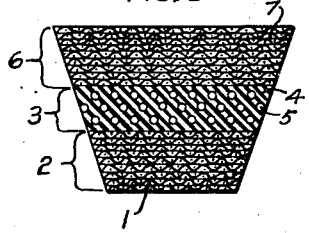
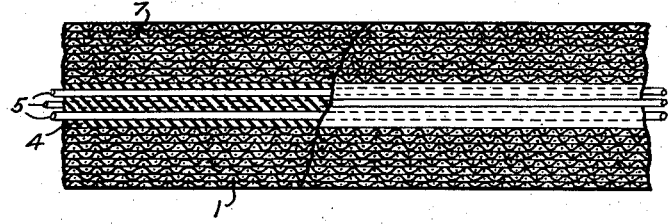
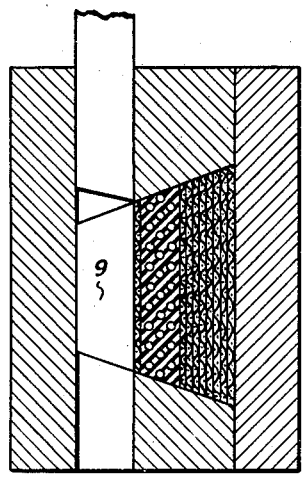
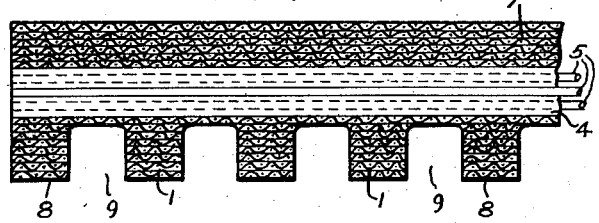
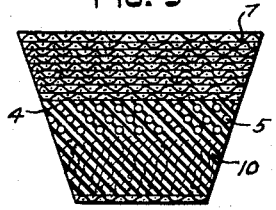
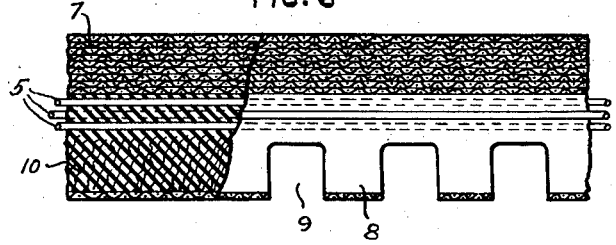
INVENTOR
ABRAHAM L. FREEDLANDER.
BY Toulmin & Toulmin
ATTORNEYS Patented Oct. 1, 1935

2,016,140

UNITED STATES PATENT OFFICE 2,016,140

BELT

Abraham L. Freedlander, Dayton, Ohio, assignor to The Dayton Rubber Manufacturing Company, Dayton, Ohio, a corporation of Ohio Refiled for abandoned application Serial No. 550,477, July 13, 1931. This application May 12, 1934, Serial No. 725,397

REISSUED

6 Claims. (Cl. 74—233)

My invention relates to belts.

It is the object of my invention to provide a belt having a compression section, a neutral axis section and a tension section with portions of the compression section removed to permit of the passage of the belt around pulleys of small diameter in use with short center drives, while, at the same time, employing, if desired, material normally difficult to compress, such as straight laid fabric.

This application is a substitute of my application Serial No. 550,477, filed July 13, 1931.

Referring to the drawing:

Figure 1 is a section through a typical belt;

Figure 2 is a side elevation thereof partially in section;

Figure 3 shows the belt having a portion sheared from the compression section to form a toothed inner wall;

Figure 4 is a side elevation of the belt with the teeth formed on the inner wall;

Figure 5 is a modification of the belt;

Figure 6 is a side elevation of the belt, partially in section, with some of the teeth cut away.

Referring to the drawing in detail, I indicates one of the layers of straight laid fabric, of which there are a number to form the compression section 2. Mounted upon the compression section 2 is a neutral axis section 3 composed of the rubber 4 and the cords 5.

These cords are inextensible so that the belt has a fixed length.

Wrapped upon the exterior of the belt to form a tension section are a plurality of layers 7 of straight laid fabric or fabric laid on the bias.

Thereafter, the belt is cut to the proper trapezoidal section and vulcanized whereupon teeth are formed as at 8 in the compression section by shearing the sections 9 therefrom so that the belt can bend sufficiently to pass over pulleys of very small diameter and short section.

Referring to Figures 5 and 6, the compression section may be made with a combination of rubber and very fine, integrally mixed textile fibers 10. In such an event the belt is vulcanized and teeth are formed in the under surface as previously described.

It will be thus seen that it is the object of my invention to provide an integral structure having a central section, a neutral axis section and a tension section, which is completely manufactured and after which there is cut from the inner margin portions to form teeth.

It will be understood that I desire to comprehend within my invention such modifications as may be necesary to adapt it to varying conditions and uses.

Having thus fully discribed my invention, what I claim as new and desire to secure by Letters Patent, is:

1. In a belt, independent tension, neutral axis and compression sections of rubber and textile material vulcanized together, said compression section comprising a continuous portion immediately adjacent the neutral axis section, and toothed portions mounted on the continuous portion.

2. In combination in a belt, of a continuous rubber and textile tension section, an independent neutral axis section comprising continuous inextensible neutral axis rubberized cords, and a compression section comprising a compression body immediately adjacent the neutral axis section having a plurality of teeth mounted thereon.

3. In combination in a belt, of a continuous rubber and textile tension section, an independent neutral axis section comprising continuous inextensible neutral axis rubberized cords, and a compression section comprising a compression body immediately adjacent the neutral axis section having a plurality of teeth mounted thereon, said teeth comprising textile and rubber material.

4. In combination in a belt, of a tension section comprising a plurality of rubberized woven fabric layers, a neutral axis section comprising a plurality of layers of inextensible concentrically wound cords embedded in rubber, and a compression section comprising a continuous layer of fabric and rubber adjacent the inside of the neutral axis section, and teeth mounted thereon comprising a plurality of rubberized layers of fabric, said belt being characterized by the fact that the rubber and textile material are vulcanized to one another.

5. In combination in a belt, of a tension section of rubber and textile material, a neutral axis section of neutral axis cords embedded in rubber, and a compression section comprising a continuous portion adjacent the neutral axis section, and a plurality of teeth mounted thereon, said compression section being composed of a plurality of layers of textile material embedded in rubber.

6. In combination in a belt, of a tension section comprising a plurality of rubberized fabric layers, a neutral axis section comprising a plurality of inextensible neutral axis cords arranged in parallelism concentrically and embedded in rubber, and a compression section consisting of a continuous portion having a plurality of teeth mounted thereon, said teeth and continuous portion comprising rubber and a textile reenforcement.

ABRAHAM L. FREEDLANDER.